United States Patent
Heidtmann et al.

(10) Patent No.: US 11,174,028 B2
(45) Date of Patent: Nov. 16, 2021

(54) SPACE EFFICIENT CABIN SEGMENT FOR A VEHICLE AS WELL AS A PASSENGER CABIN HAVING A PLURALITY OF SEATS AND SUCH A CABIN SEGMENT

(71) Applicant: AIRBUS OPERATIONS GMBH, Hamburg (DE)

(72) Inventors: Andreas Heidtmann, Hamburg (DE); Tobias Dahms, Hamburg (DE); Roland Lange, Hamburg (DE); Markus Wirth, Hamburg (DE); Jörg Weifenbach, Hamburg (DE)

(73) Assignee: Airbus Operations GmbH

( * ) Notice: Subject to any disclaimer, the term of this patent is extended or adjusted under 35 U.S.C. 154(b) by 713 days.

(21) Appl. No.: 15/926,693

(22) Filed: Mar. 20, 2018

(65) Prior Publication Data

US 2018/0208314 A1    Jul. 26, 2018

Related U.S. Application Data (63) Continuation of application No. PCT/EP2016/073491, filed on Sep. 30, 2016.

(30) Foreign Application Priority Data

Oct. 2, 2015  (DE) .......................... 102015116804.9

(51) Int. Cl.
*B64D 11/00* (2006.01)
*B64D 11/02* (2006.01)
(Continued)

(52) U.S. Cl.
CPC .......... *B64D 11/0007* (2013.01); *B64D 11/02* (2013.01); *B64D 11/04* (2013.01);
(Continued)

(58) Field of Classification Search
CPC ............ B64D 11/0007; B64D 11/0691; B64D 11/0698; B64D 11/02; B64D 11/04
See application file for complete search history.

(56) References Cited

U.S. PATENT DOCUMENTS

| 7,198,228 B2 * | 4/2007 | Mills | B64D 11/00 244/118.5 |
| 7,562,844 B2 * | 7/2009 | Boren | B64D 11/04 244/117 R |

(Continued)

FOREIGN PATENT DOCUMENTS

| DE | 102010012989 A1 | 9/2011 |
| DE | 102010035375 A1 | 3/2012 |

(Continued)

OTHER PUBLICATIONS

European Patent Office, International Search Report for International Application PCT/EP2016/073491, dated Dec. 7, 2016, 2 pages.

*Primary Examiner* — Philip J Bonzell
(74) *Attorney, Agent, or Firm* — Lerner, David, Littenberg, Krumholz & Mentlik, LLP (57) ABSTRACT

A cabin segment for a vehicle includes a first lateral segment module having a first main extension axis, a second lateral segment module having a second main extension axis, and an aisle arranged in the cabin segment. The main extension axes parallel to each other, and the first and second lateral segment modules are distanced from each other in a direction perpendicular to the main extension axes and enclose the aisle, which runs parallel to the main extension axes. At least one of the first lateral segment module and the second lateral segment module includes a lavatory accessible through a lavatory opening positioned outside the aisle. The first lateral segment module includes at least one receiving (Continued)

space to receive serving trolleys. The at least one receiving space has a receiving opening facing into the aisle.

15 Claims, 7 Drawing Sheets

(51) Int. Cl.
*B64D 11/04* (2006.01)
*B64D 11/06* (2006.01)
(52) U.S. Cl.
CPC ...... *B64D 11/0691* (2014.12); *B64D 11/0698* (2014.12); *B64D 2011/0046* (2013.01)

(56) References Cited

U.S. PATENT DOCUMENTS

| | | | | |
|---|---|---|---|---|
| 8,608,108 | B2* | 12/2013 | Boren | B64D 11/00 244/118.5 |
| 9,327,833 | B2* | 5/2016 | Ehlers | B64D 11/02 |
| 2003/0029967 | A1* | 2/2003 | Mills | B64D 11/00 244/118.5 |
| 2003/0141413 | A1* | 7/2003 | Brasseur | B60H 1/00371 244/118.5 |
| 2003/0189132 | A1* | 10/2003 | Brady | B60H 1/00 244/118.5 |
| 2006/0113427 | A1* | 6/2006 | Saint-Jalmes | B64D 11/0601 244/118.5 |
| 2009/0261200 | A1 | 10/2009 | Saint-Jalmes et al. | |
| 2014/0008492 | A1* | 1/2014 | Ehlers | B64D 11/02 244/118.5 |
| 2014/0097294 | A1 | 4/2014 | Boren et al. | |
| 2014/0124622 | A1 | 5/2014 | Boren et al. | |
| 2014/0196206 | A1* | 7/2014 | Savian | A47K 4/00 4/664 |
| 2014/0291446 | A1* | 10/2014 | Reams | B64D 11/02 244/118.5 |
| 2015/0069180 | A1* | 3/2015 | Brunaux | B64D 11/02 244/118.5 |
| 2016/0009395 | A1* | 1/2016 | Savian | B64D 11/02 244/118.5 |

FOREIGN PATENT DOCUMENTS

| | | |
|---|---|---|
| DE | 102011011704 A1 | 12/2012 |
| DE | 102013108121 A1 | 2/2015 |
| DE | 102014102378 A1 | 8/2015 |
| EP | 2803577 A1 | 11/2014 |
| WO | 2012136327 A2 | 10/2012 |
| WO | 2014071335 A1 | 5/2014 |
| WO | 2014124987 A1 | 8/2014 |
| WO | 2014125046 A1 | 8/2014 |

* cited by examiner

SPACE EFFICIENT CABIN SEGMENT FOR A VEHICLE AS WELL AS A PASSENGER CABIN HAVING A PLURALITY OF SEATS AND SUCH A CABIN SEGMENT

CROSS-REFERENCE TO PRIORITY APPLICATIONS

This application is a continuation of international patent application number PCT/EP2016/073491, having an international filing date of Sep. 30, 2016, which claims priority to German patent application number DE 102015116804.9, having a filing date of Oct. 2, 2015. The content of the referenced applications is incorporated by reference herein.

TECHNICAL FIELD

Embodiments of the subject matter described herein relate generally to a cabin segment for a vehicle, a passenger cabin having a plurality of seats, such a cabin segment, as well as a vehicle.

BACKGROUND

Vehicles and particularly aircraft, that serve the transport of passengers and comprise a cabin with passenger seats arranged therein, often comprise a maximum passenger capacity for achieving economic advantages. Besides the integration of passenger seats, further equipment features are necessary particularly for longer distances covered by the vehicle, in order to ensure the well-being of the passengers. For example, a plurality of toilets and galley arrangements are required, which are usually provided in self-contained cabin monuments.

Increasing a passenger capacity with unchanged dimensions of the vehicle is difficult to accomplish, without limiting the comfort of the passengers. Concepts for equipping particularly cabin monuments with a plurality of functions are known, such that an advantage in the use of available installation space is achieved.

German patent publication DE 10 2011 011 704 A1 exemplarily shows a modular cabin segment for a vehicle having segment modules arranged one next to the other, wherein one may exemplarily house a toilet arrangement having at least one lavatory and another one may comprise a galley equipment. At least one of the modules may comprise a vehicle attendant seat, which at one side is swivably mounted around an axis on the respective module.

German patent publication DE 10 2010 035 375 A1 illustrates an arrangement for receiving passengers in a transportation means, which arrangement comprises a first placement space, a second placement space and a third placement space, which are arranged on a common placement surface one next to the other, wherein two of the placement spaces are equipped with a receiving unit for receiving a passenger, while one of the placement spaces receives a stowage cabinet.

BRIEF SUMMARY

Consequently, it is an object of the disclosure to design a cabin for a vehicle in a way that a most efficient use of the available installation space is ensured. Particularly, it is an object of the disclosure to propose a cabin segment for a vehicle, which allows a most compact integration of a lavatory under maximizing the passenger seats present.

The object is met by a cabin arrangement for a vehicle having the features of independent claim 1. Advantageous embodiments and further improvements can be gathered from the sub-claims and the following description.

A cabin segment for a vehicle is proposed, comprising a first lateral segment module having a first main extension axis, a second lateral segment module having a second main extension axis and an aisle arranged in the cabin segment. The first main extension axis and the second main extension axis run parallel to each other. The first lateral segment module and the second lateral segment module are distanced from each other in a direction perpendicular to the main extension axes and enclose the aisle, which runs parallel to the main extension axes. At least one of the first lateral segment module and the second lateral segment module comprises a lavatory, which is accessible through a lavatory opening positioned outside the aisle. The first lateral segment module comprises at least one receiving space for receiving of serving trolleys, wherein the at least one receiving space comprises a receiving opening, which is facing into the aisle.

Resultantly, the cabin segment according to the disclosure is spatially defined through two lateral segment modules, which each comprises a main extension axis, such that substantially three elements parallel to each other, i.e. first lateral segment module, aisle and second lateral segment module, are provided. The cabin segment may particularly extend over a whole available area of the cross-section of a passenger cabin in a lateral direction.

The term "lateral segment module" is to be considered a part of the cabin segment, which is arranged in a lateral, i.e. sideways placed, region and preferably extends along a lateral region of the respective cabin. In case of an elongate and particularly tube-shaped passenger cabin, a main extension axis of a lateral segment module is thus parallel to a longitudinal or central axis of the respective cabin.

Hence, the aisle is a surface region created on the floor between sides of the lateral segment modules facing to each other and allows a user to step between the lateral segment modules, in order to use the different functions offered by the cabin arrangement.

The main extension axes define main extension directions, wherein "main" may be understood as referring to the dimension which is determining for the respective segment module.

The cabin segment thus may constitute a particular space-saving, compact combination from at least one lavatory and a galley having at least a basic installation, in that placement spaces for serving trolleys and at least one lavatory are combined with each other, wherein the access openings are accessible from different positions and wherein the serving trolleys are positionable in a lateral, longitudinal arrangement. The cabin segment suits for an integration into a cabin of a vehicle as a closed arrangement, which extends over the whole cross-section of the cabin. Particularly preferred, the cabin segment is placed directly in front of a pressure bulkhead in a cabin, wherein a flat pressure bulkhead particularly suggests itself. At the same time, as soon as the aisle is not closed off through a wall or similar component, the cabin segment may be placed in a forward part of a passenger cabin in an aircraft, to which a cockpit connects, which would be accessible through the aisle.

In an advantageous embodiment, the at least one receiving space is designed for receiving serving trolleys, which are arranged transverse to the first main extension axis and are staggered parallel to the first main extension axis. Thus, a plurality of serving trolleys is insertable into the receiving space from the aisle, wherein the serving trolleys are staggered along the main extension axis of the respective segment module. Depending on the design of the first lateral segment module or depending of its additional installations, respectively, serving trolleys with different construction depths may be used. If a lavatory is placed in the first lateral segment module, exemplarily serving trolleys having a half construction depth may be staggered along the main extension axis lateral adjacent to the lavatory, while a further or multiple further serving trolleys may be insertable into the receiving space, in case at least a part of the receiving space is not overlapped from the lavatory in a lateral direction.

In an advantageous embodiment, at least one of the lateral segment modules comprises a first compartment, which is closed at a side facing the aisle. The first compartment comprises an access opening arranged parallel to the main extension axis. The compartment may therefore comprise a stowage space or an integration tray for a certain piece of equipment, which runs parallel to the main extension axes and is activatable, handleable or operatable from this direction. Through the arrangement of the first compartment transverse to the orientation of a serving trolley in the receiving space, a particularly compact design may be accomplished, since a side of the first compartment facing the aisle may be flush with a plane, which is constituted by the receiving opening in the receiving space, such that at the side of the first compartment facing away from the aisle, an installation space as large as possible, e.g. for integration the lavatory, is unblocked.

The first compartment may furthermore be designed for receiving at least one electrical kitchen appliance. Besides the supply with a suitable voltage for electrical kitchen appliances, additionally an air suction opening and exemplarily a water supply may be present. It may be feasible to provide a device for preparing drinks in such a first compartment, e.g. a coffeemaker or similar.

Further, at least one of the lateral segment modules comprises at least one second compartment having an access opening, which runs perpendicular to the main extension axes. This second compartment is thus accessible directly from the aisle between the lateral segment modules in direct viewing direction perpendicular to the main extension axes. Depending on the available surface area, a matrix of second compartments may be provided, which serve different purposes. It is particularly preferred to provide the second compartment above the receiving space for receiving of serving trolleys and to additionally provide a working surface on the receiving space with a sufficient free volume between the working surface and the at least one second compartment. The working surface and the working area, which directly connects above, allows to place items, prepare meals and the such. The at least one second compartment may be open, having flaps, for receiving of standard units, which may retain different items for use in a vehicle galley.

In an advantageous embodiment, the cabin segment comprises a third segment module, which is positioned at a side of the cabin segment facing away from the lavatory opening and which extends between the first lateral segment module and the second lateral segment module. The third segment module comprises a second working surface, which is swivable around a horizontal axis, which is located at a side of the cabin segment facing away from the lavatory opening, into a substantially vertical stowage position and a horizontal use position. Thus, at the end of the aisle, a third segment module is arranged, which may particularly serve for receiving of further serving trolleys. The integration of a swivably supported working surface allows to increase the working surface within the cabin segment according to the disclosure and, however, also allows the simple removal of serving trolleys, which are arranged in the first lateral segment module and are placed at a position, which is covered/hidden to the aisle by means of the third segment module. Swiveling the working surface up and optionally previously clearing the space underneath the swivable working surface opens the passage for all remaining serving trolleys, particularly from the first lateral segment module.

As mentioned above, the first lateral segment module preferably comprises a working surface above the receiving space for serving trolleys, which has a height that substantially equals a height of the working surface of the third segment module in a horizontal use position.

The receiving space may comprise a holding frame that is swivably supported in a horizontal plane and holds a serving trolley, which is directly adjacent to the third segment module in the receiving space, and releases it through swiveling. In case a third segment module is placed in the cabin segment, at least one placement space in the receiving space may at least partially be blocked, such that only through swiveling the working surface of the third segment module up a removal of a serving trolley from the first lateral segment module is possible. In the case of integration particularly of serving trolleys having a full construction depth, it would have to be pulled from its placement space along a rather long distance in order to reach the aisle through turning it. By swiveling the holding frame in a horizontal plane, it may be rendered possible for the serving trolley to be rotated already within the receiving space slightly and, after a small pulling motion, to be rotated further, such that it may be pulled into the aisle more easily. This particularly allows the conception of a particularly narrow aisle and allows handling the serving trolley without a risk of injury for the user.

Each of the lateral segment modules may furthermore comprise a front, which directly connects to a door region of the vehicle. The front preferably comprises the access opening to the at least one lavatory, wherein through arranging the front directly at the door region, in which no passenger seats are positionable anyway, no installation space is wasted in the interior of the cabin. The cabin segment may resultantly be constructed directly up to the door region, which leads to a further efficient use of the available installation space.

At least one lateral segment module comprises a holding device, which is positioned exterior to the aisle and exterior to the receiving space, for temporarily holding a serving trolley. Due to the compact design of the cabin segment and the narrow aisle in some embodiments, it is necessary to place a serving trolley exterior to the cabin segment for filling, emptying or re-sorting serving trolleys, which requires, particularly in case of the use in an aircraft, a temporary holding of the respective serving trolley. Besides swivably supported holding frames or other form-fit elements, a holding belt may be provided in a particularly simple variant, which belt may be placed around a serving trolley and be arrested.

At least one lateral segment module may comprise a door for closing an access opening, in particular a lavatory opening, which door comprises a vehicle attendant seat arranged thereon. Particularly in narrow, rearward regions of a passenger cabin, one of the lateral segment modules may be designed so narrow, that the integration of a separate vehicle attendant seat at a fixed walling is not possible.

Through the integration into or onto a door, however, the installation space occupied by the door may be used for two functions.

Furthermore, at least one lateral segment module may comprise a fixed walling facing away from the aisle, onto which walling a vehicle attendant seat is arranged. This may relate to the case that a closable access opening is not present, but also to the case that a front provides a sufficient place for receiving both a fixed walling and a door. In case the cabin segment according to the disclosure is arranged at a rearward section of the passenger cabin, a front may be present at the lateral segment modules, onto which vehicle attendant seats are integratable. These then already comprise reasonable seating direction, which is directed forward into the cabin.

Embodiments of the invention further relate to a passenger cabin, comprising a plurality of seats and at least one cabin segment as explained above.

Furthermore, embodiments of the invention relate to a vehicle, comprising a passenger cabin having a plurality of seats and at least one such cabin segment. Particular advantageously the vehicle is an aircraft and the cabin segment is arranged at a rear end of the passenger cabin, which is pressurizable and which comprises a pressure bulkhead at the rear end. The pressure bulkhead or a lining in front of it, respectively, thereby creates the rear limitation of the cabin segment in the respective passenger cabin. As explained above, the cabin segment may be arranged in a forward part of the passenger cabin of an aircraft and allows an access to a cockpit through the aisle.

This summary is provided to introduce a selection of concepts in a simplified form that are further described below in the detailed description. This summary is not intended to identify key features or essential features of the claimed subject matter, nor is it intended to be used as an aid in determining the scope of the claimed subject matter.

BRIEF DESCRIPTION OF THE DRAWINGS

Other characteristics, advantages and potential applications of the present disclosure result from the following description of the exemplary embodiments illustrated in the figures. In this respect, all described and/or graphically illustrated characteristics also form the object of the disclosure individually and in arbitrary combination regardless of their composition in the individual claims or their references to other claims. Furthermore, identical or similar objects are identified by the same reference symbols in the figures.

DETAILED DESCRIPTION

The following detailed description is merely illustrative in nature and is not intended to limit the embodiments of the subject matter or the application and uses of such embodiments. As used herein, the word "exemplary" means "serving as an example, instance, or illustration." Any implementation described herein as exemplary is not necessarily to be construed as preferred or advantageous over other implementations. Furthermore, there is no intention to be bound by any expressed or implied theory presented in the preceding technical field, background, brief summary or the following detailed description.

Figure 1:
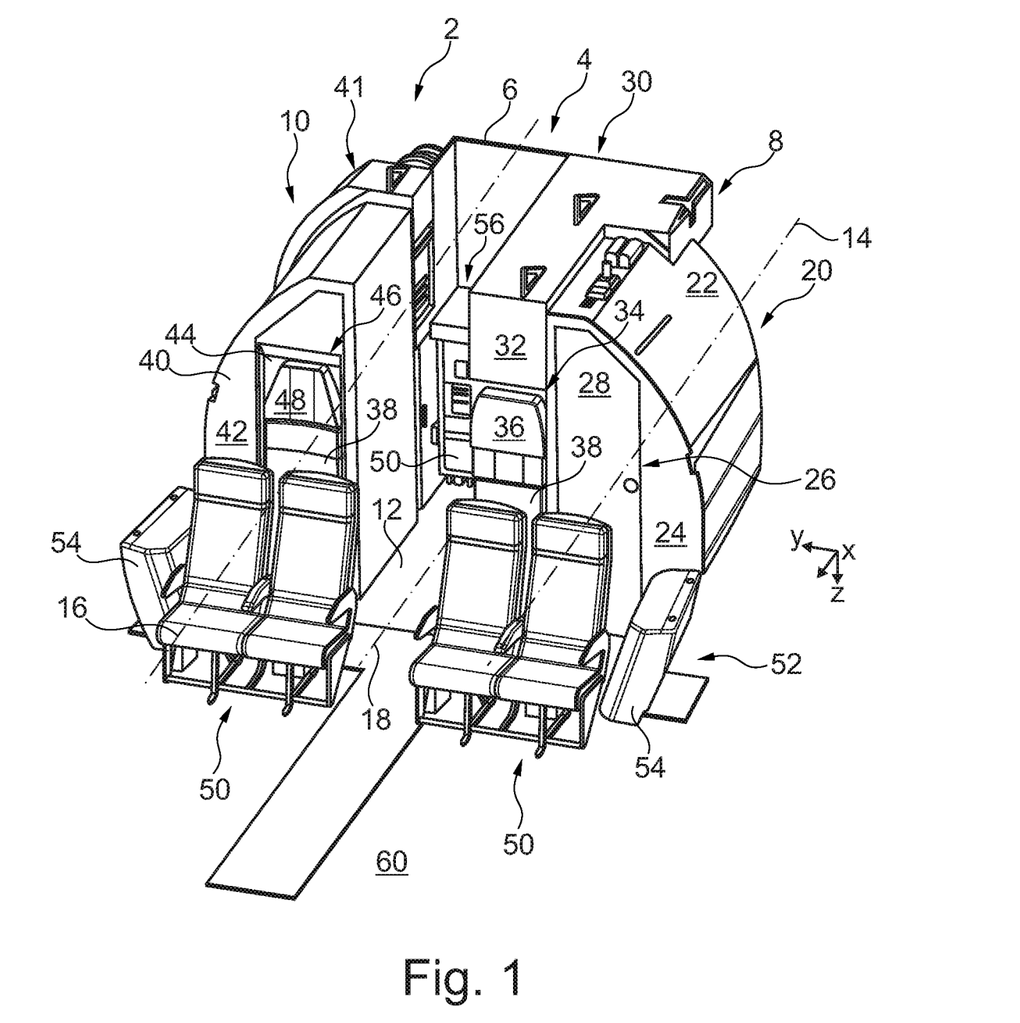
FIG. 1 shows a cabin segment in a three-dimensional illustration.

FIG. 1 shows a cabin segment 2 which is arranged at a rearward end 4 of a passenger cabin directly in front of a pressure bulkhead 6. The cabin segment 2 comprises a first lateral segment module 8 as well as a second lateral segment module 10, which enclose an aisle 12. The first lateral segment module 8 comprises a first main extension axis 14, the second lateral segment module 10 comprises a second main extension axis 16 and the aisle 12 comprises an extension axis 18, which extension axes are all parallel relative to each other.

The lateral segment modules 8 and 10 are designed asymmetrically relative to each other. Thus, the first lateral segment module 8 comprises a lavatory 20, which has an outer walling 22 adapted to a fuselage contour as well as front or lavatory front 24, respectively, facing forwardly in a longitudinal direction X, wherein the front 24 comprises a lavatory opening 26, which is closable through a first door 28. The first lavatory opening 26 together with the front 24 lies in a direction perpendicular to the first main extension axis 14; an access along the first main extension axis 14 is thus possible.

The dimensions of the first lavatory 20 are relatively compact, the first door 28 is beveled at a laterally outwardly facing upper region in order to follow the inner contour of the fuselage.

Laterally further inward a first galley region 30 connects to the first lavatory 20, which galley region extends in a rearward region behind the first lavatory 20 and comprises a further front or galley front 32, respectively, at a side facing away from pressure bulkhead 6, which front 32 is flush with the first lavatory front 24. As a fixed walling, the first galley front 32 comprises a depression 34, into which a first flight attendant seat 36 is integrated. This comprises a swivably supported seating surface 38, which is shown in a stowage position in FIG. 1. A vehicle attendant may sit on the vehicle attendant seat 36 and may view into the cabin along the longitudinal direction X.

The second lateral segment module comprises a second lavatory 40 having a second lavatory front 42, in which a second lavatory opening 46 is closed through a second lavatory door 44. The specific feature of this second lavatory door 44 is the integration of a second vehicle attendant seat 48, which also comprises a swivably supported seating surface 38, which is shown in a stowage position. A second galley region 41 is placed between the second lavatory 40 and the pressure bulkhead 6, which second galley region 41 is better recognizable in top views of FIGS. 8 and 9. Here, further compartments may be provided, which are particularly oriented perpendicular to the second main extension axis 16.

Particularly preferred the first lavatory front 24, the first galley front 32 and the second lavatory front 42 are all at the same position in X-direction of the passenger cabin, such that a uniform appearance is provided and passenger seats 50, which are forward in X-direction, each comprise the same distance to the respective front 24, 32 or 42, respectively.

It is feasible to place the cabin segment 2 in such a region of the passenger cabin that allows that the cabin segment protrudes directly into a door region 52 or ends there, respectively. The door region is a region in the cabin of a vehicle between two access doors or in front of an access door, wherein in FIG. 1 the doors are exemplarily indicated through slide compartments 54 integrated thereon.

A third segment module 56 extends at the rearward end of the cabin segment 2, which third segment module 56 shows a serving trolley 58 in this view. Further details are visible in the subsequent figures.

Figure 2:
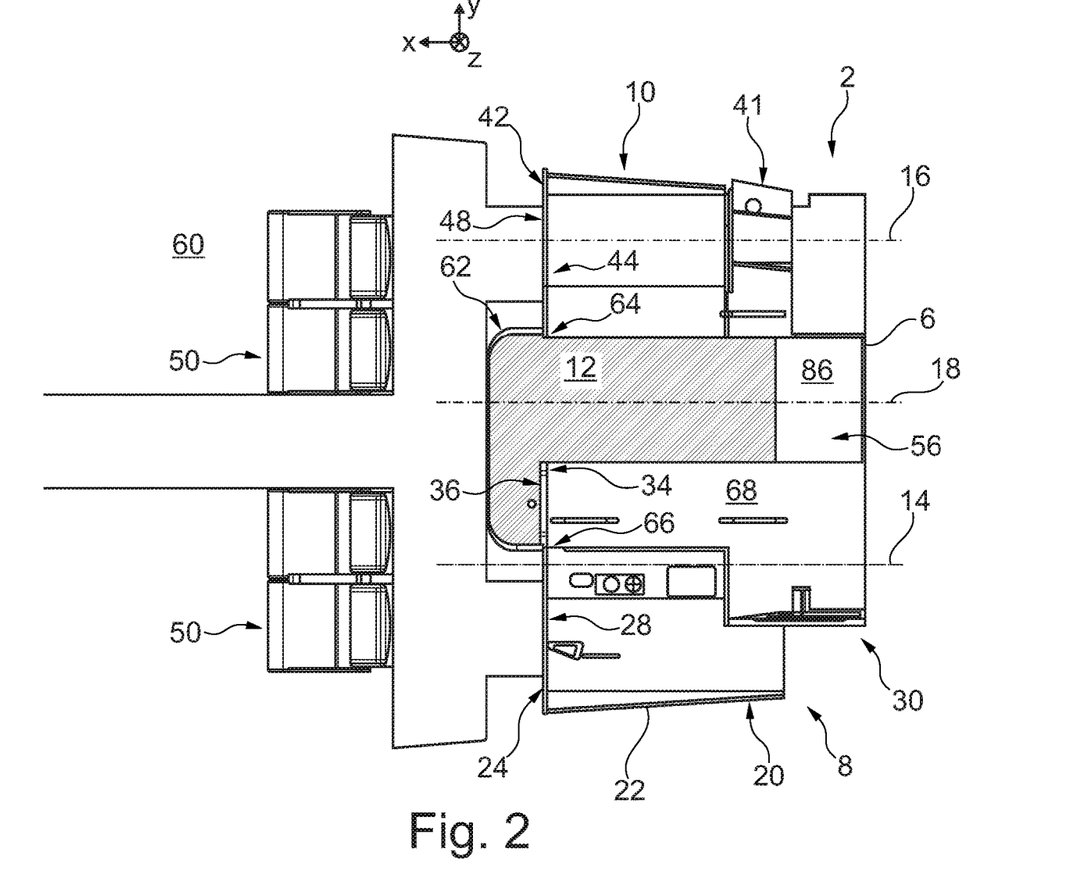
FIGS. 2 and 3 show the cabin segment with a partition curtain in two different positions.

FIG. 2 shows a top view onto a cabin 60 with cabin segment 2 integrated therein. Here, particularly the relatively flat shape of the pressure bulkhead 6 is recognizable. The installations of the lateral segment modules 8 and 10 or the third segment module 56, respectively, are shown in FIGS. 4 to 10. FIG. 2 shows the arrangement of the aisle 12 between both segment modules 8, 10 and the third segment module 56. Exemplarily, a partition curtain 62 is shown, which extends from an edge 64 facing into the aisle 12 and a lateral outer edge 66 of the first galley front 32. Hereby, temporarily a kind of rest compartment is created, in which a cabin attendant may undisturbedly sit, e.g. after serving of meals. Both lavatories 20 and 40 are completely usable, since the lavatory doors 28 and 44 are unblocked. The partition curtain 62 may be slightly distanced in X-direction from cabin segment 2 into the direction of the cabin 60 at least in a region, without disturbing the passengers, which move to and from the lavatories 20 and 40.

Figure 3:
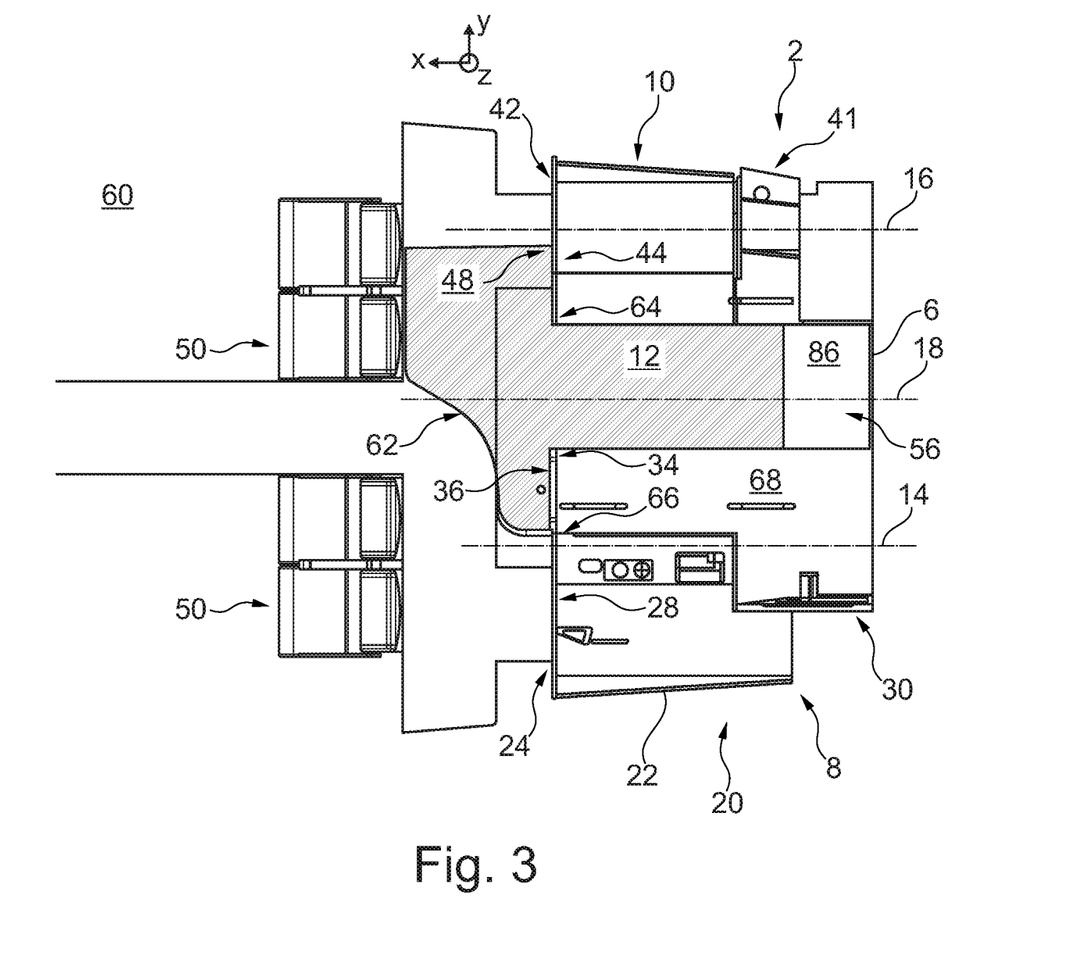

FIG. 3 shows a modification, in which the partition curtain 62 separates a clearly larger region in comparison to FIG. 2. The partition curtain extends from the outer edge 66 of the first galley front 32 to a passenger seat located diagonally opposite, inwardly facing and laterally extends further outward from there. Thereby, a very large temporary working region is created, in which serving trolleys may be placed exterior to the cabin segment 2 or the aisle 12, respectively, which serving trolleys are to be filled, wherein the total surface area may at least be twice as large as the surface area of the aisle 12.

Figure 4:
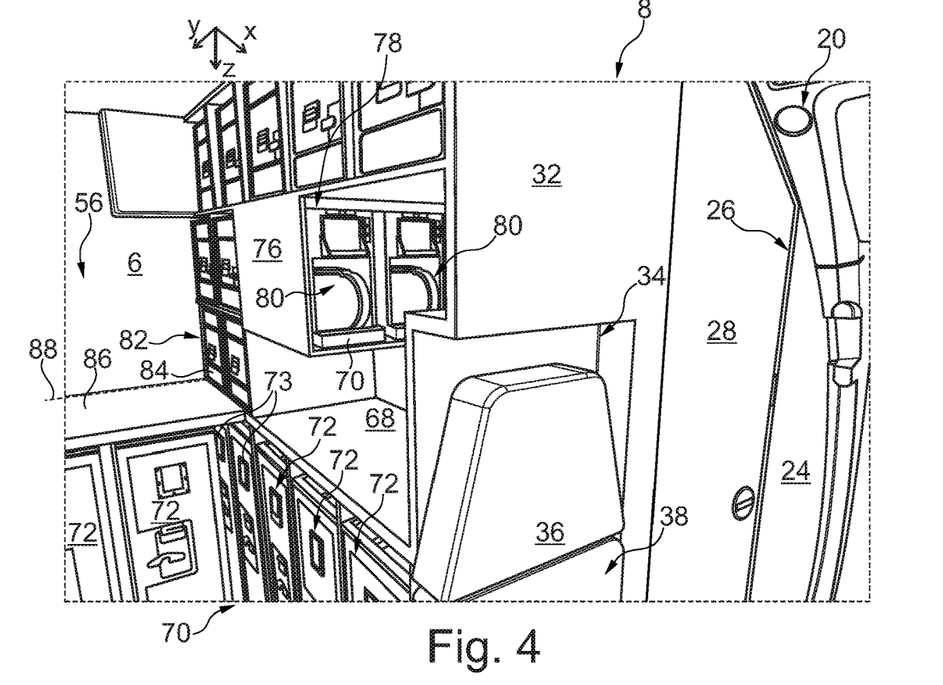
FIGS. 4 to 7 show details from the interior space of the cabin segment.

FIG. 4 shows a partial view of an interior of the cabin segment 2 in a spatial illustration. Here, particularly the first lateral segment module 8 is shown with the first vehicle attendant seat 36 in the foreground, which is substantially flush with the first lavatory front 24 due to its arrangement in the depression 34. At a rearward end behind the vehicle attendant seat and laterally displaced inwardly from lavatory 20, a first working surface 68 extends parallel to the extension axis 18 of aisle 12 or the first main extension axis 14 of the first segment module into the direction of the pressure bulkhead 6. A receiving space 70 for receiving serving trolleys having a half construction depth and serving trolleys 63 having a full construction depth is arranged underneath the first working surface 68, wherein the serving trolleys are arranged perpendicularly to the main extension axis 18 of the aisle 12, but are staggered parallel thereto.

In a distance of approximately 25 to 35 cm, a first compartment 74 is arranged above the first working surface 68, wherein the compartment 74 comprises a closed sidewall 76 facing to the aisle 12. An access opening 78 of the first compartment 74 parallel to the first main extension axis 14 or the extension axis 18 of the aisle 12 is accessible, into which compartment 74 exemplarily two coffeemakers 80 as electrical kitchen appliances are integrated and operatable along this direction. For this purpose, a sufficient distance between the depression 34 and the access opening 78 is to be maintained.

Additionally, a plurality of second compartments 82 is arranged on a side of the lavatory 20, which faces into the aisle, which compartments carry a so-called "standard unit" 84. Exemplarily, nine standard units are arranged behind the first galley front 32 or the depression 34, respectively and the lavatory 20 alone.

A second working surface 86 of the third segment module 56 extends from the first working surface 68 or the lowermost standard units 84 above the aisle 12, wherein underneath the second working surface 86 further serving trolleys are present, which are arranged parallel to the main extension axis of the aisle 12.

Figure 5:
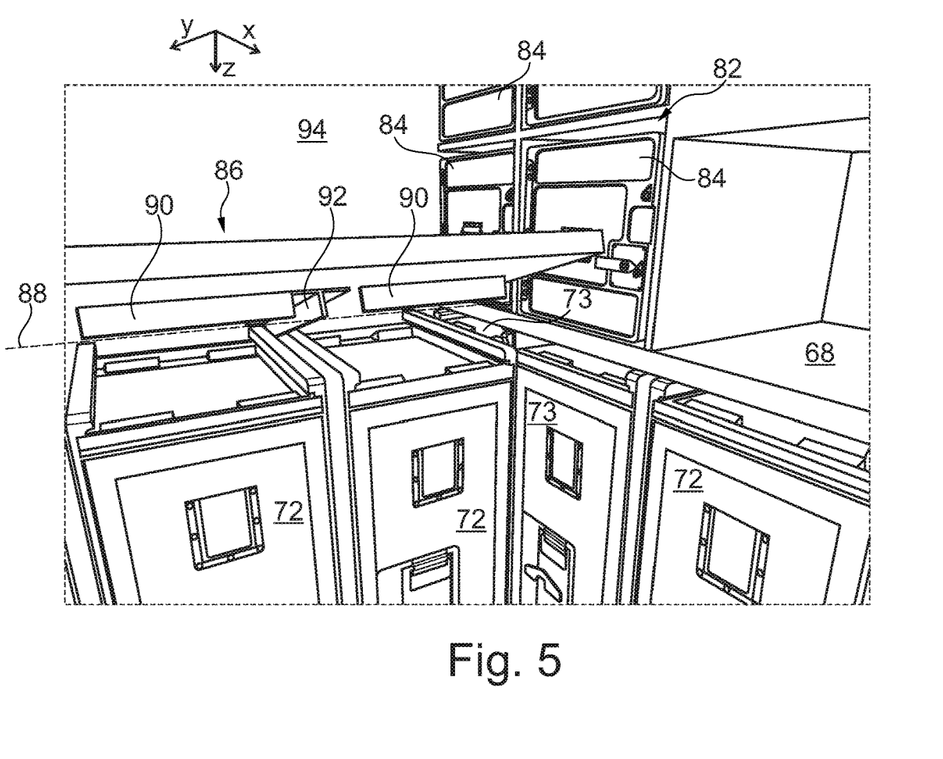

In order to remove the two serving trolleys 73 from the receiving space 70, which trolleys are arranged close to the pressure bulkhead 6, the second working surface 86 as well as the serving trolleys 72 underneath would be in the way. As shown in FIG. 5, the second working surface 86 may be swiveled around a horizontal swiveling axis 88, such that it may be brought into a substantially vertical stowage position. Thereby, the serving trolleys 72 underneath will be released, which are held by horizontal frame elements 90 oriented transverse to the extension axis 18 of the aisle 12 and frame elements arranged parallel thereto with the second working surface 86 swiveled down. FIG. 5 shows the process of swiveling the second working surface 86 up, wherein the second working surface 86 is swiveled to the rearward walling 94 passing the lower standard units 84.

Figure 6:
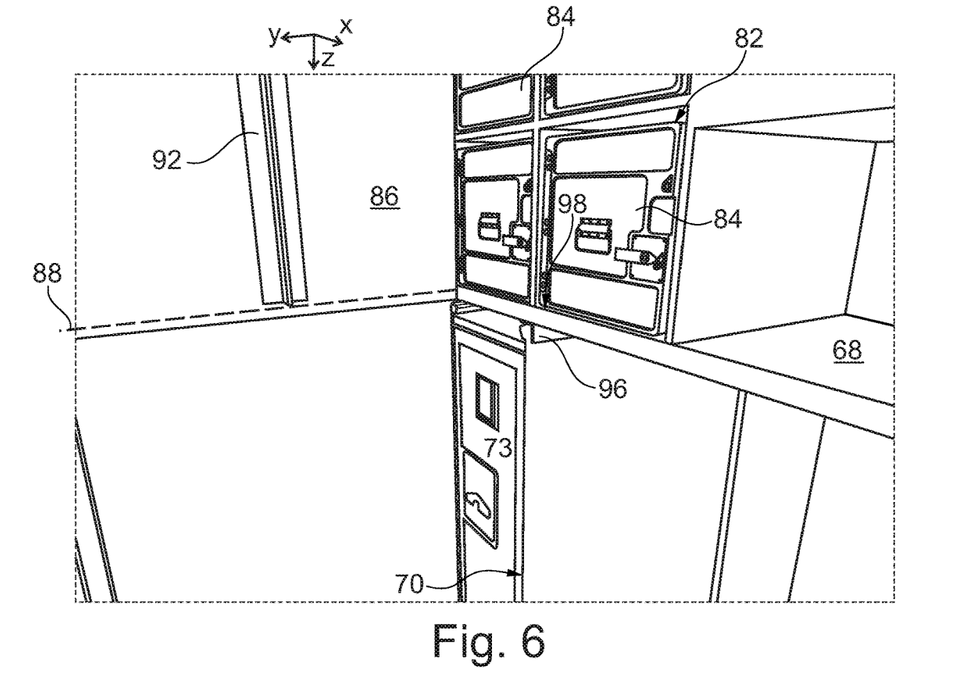
Figure 7:
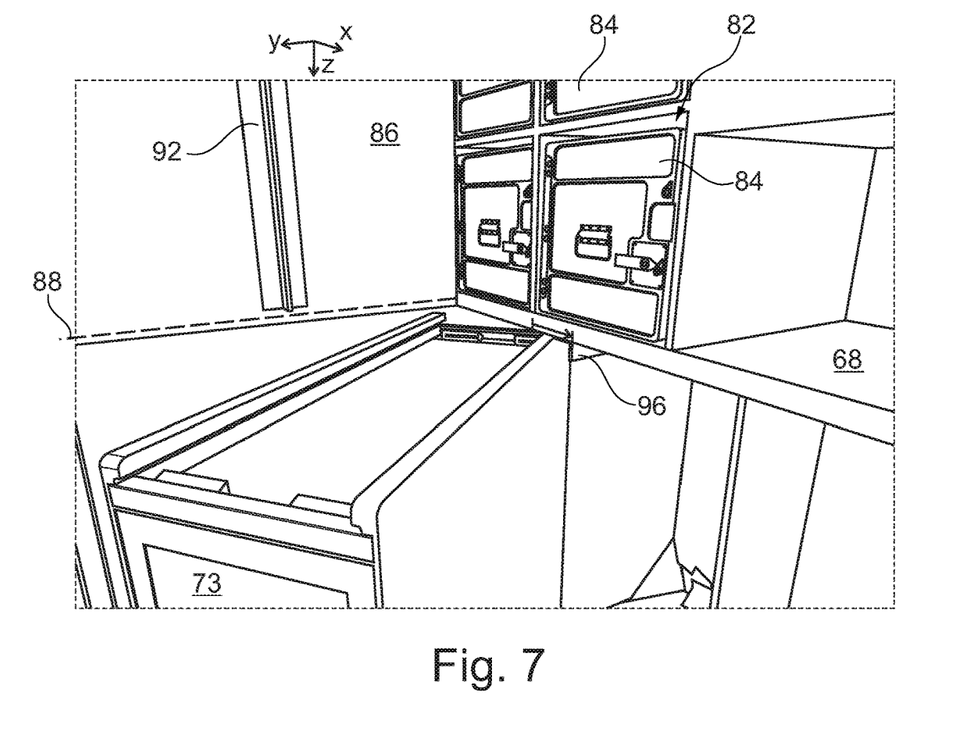

In FIG. 6, the second working surface 86 is fully swiveled into the vertical position, all serving trolleys 72 underneath are removed. A serving trolley 73 underneath the first working surface 68 is also removed, such that finally only one remaining serving trolley 73 is shown. In order to remove this from the receiving space 70, a further holding frame, exemplarily in form of a frame element 96, which is arranged at the underside of the first working surface 68 and extends transverse to the extension axis 18, is swiveled along the extension axis 18 at least at an inward end 98. Hereby, a particularly advantageous curve radius may be defined, through which also large serving trolleys having a full construction depth may easily be removed from the receiving space 70. This is shown in FIG. 7, where the serving trolley 73 from FIG. 6 is almost fully moved out of the receiving space 70 and is arranged substantially diagonal to the extension axis 18 of aisle 12.

Figure 8:
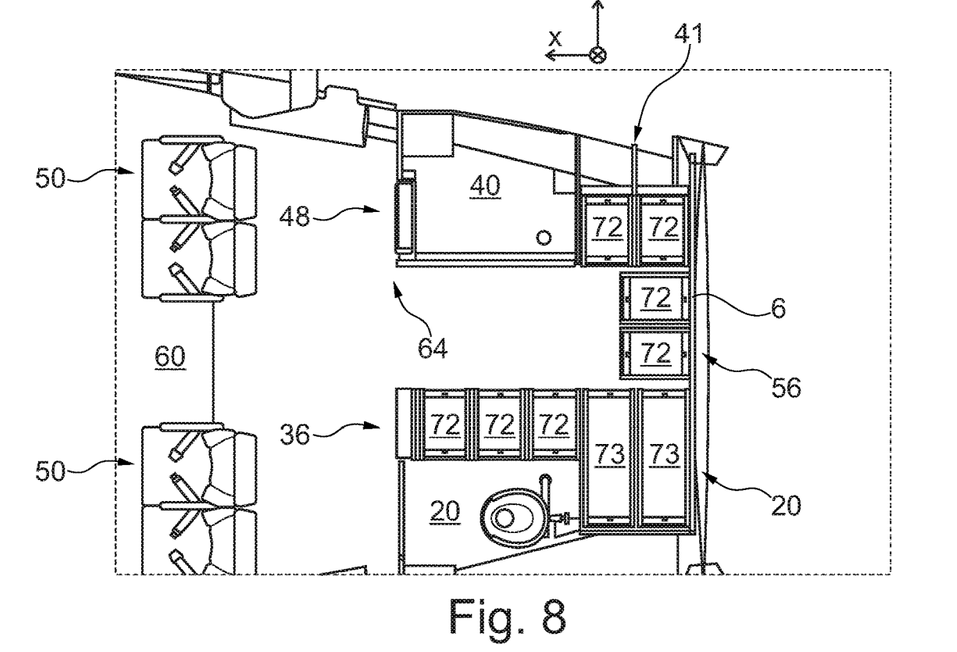
FIGS. 8 and 9 show the cabin segment in a top view with differently positioned serving trolleys.
Figure 9:
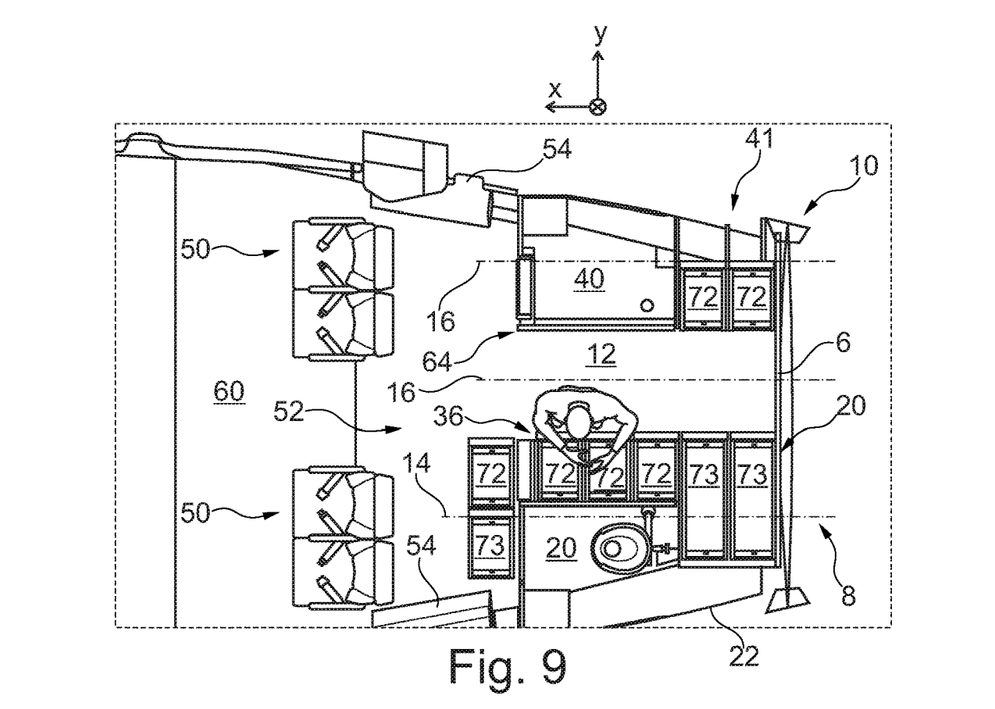

FIGS. 8 and 9 schematically show the use of the cabin segment 2 in a passenger cabin having a single, centrally arranged aisle, as exemplarily realized in an aircraft of the A320 family of Airbus. While the first galley region 30 may receive two serving trolleys having a full construction depth and three serving trolleys having a half construction depth in total, two serving trolleys 72 having a half construction depth may be arranged in the third segment module 56, between the third segment module 56 and the second lateral segment module 10, a total of two serving trolleys 72 having a half construction depth may be arranged in the second galley region 41. Resultantly, in total seven serving trolleys 72 having a half construction depth and two serving trolleys 73 having a full construction depth may be stowed, while two lavatories 20 and 40 are well accessible from the cabin and additionally two vehicle attendant seats 36 and 48 are realizable. Thereby, a very compact and particularly efficient arrangement of components is achieved, which allows a maximizing of functions particularly at a rear end of a passenger cabin.

FIG. 9 shows that additional serving trolleys 72 may temporarily be arranged at the first lavatory front 24 and the first galley front 32, which exemplarily originate from another galley and may be filled or emptied in the rearward galley.

Figure 10:
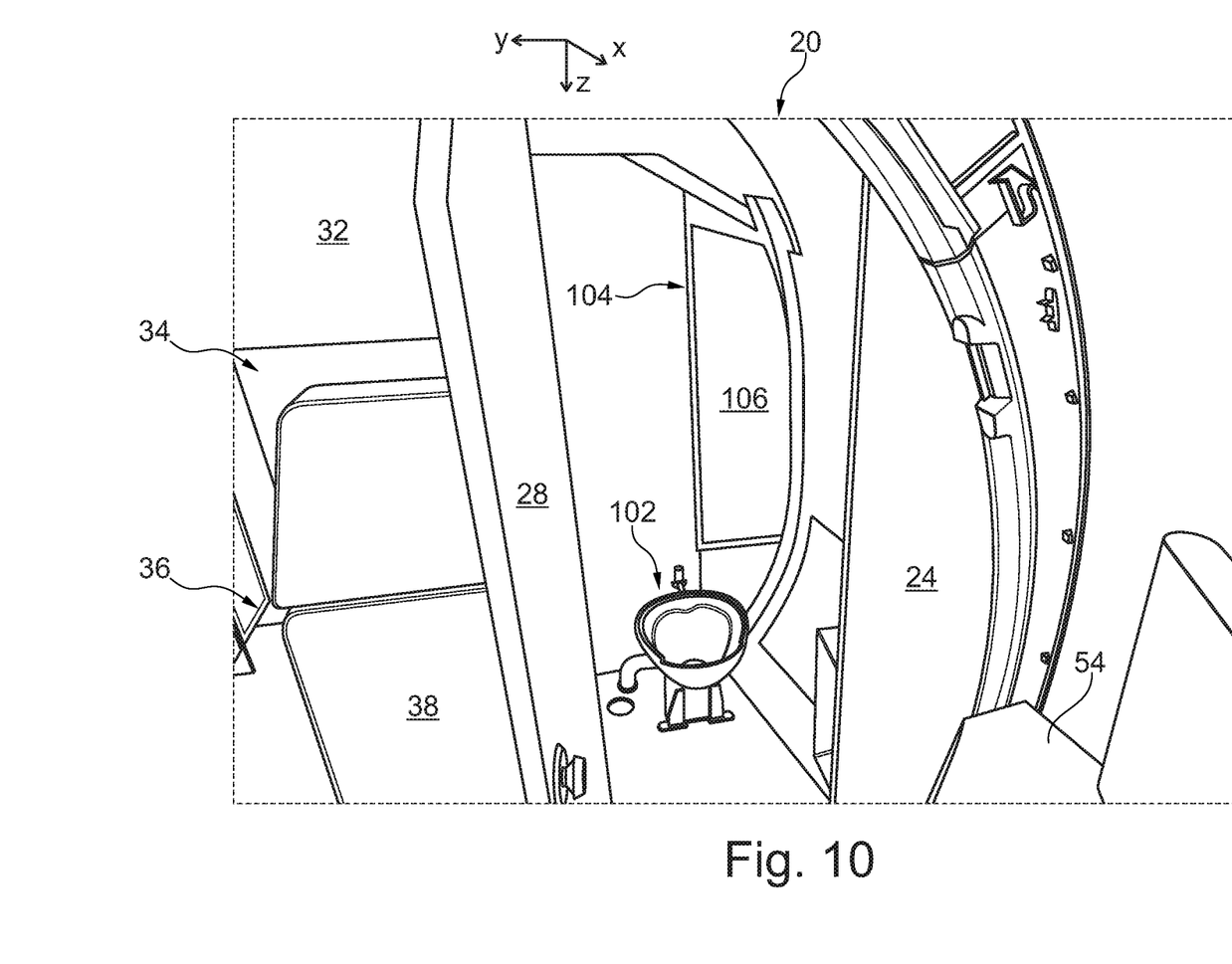
FIG. 10 shows a lavatory in the first lateral segment module in a three-dimensional illustration.

FIG. 10 shows the interior of the first lavatory 20 exemplarily in a spatial illustration, in which lavatory a toilet 102 is positioned at a rearward end and, due to the curved fuselage structure, an exterior stowage compartment 104 is realizable, which is closable through a flap or a door 106, respectively. Here, exemplarily a wheelchair or the such for use on board may be stowed.

In addition, it should be pointed out that "comprising" does not exclude other elements or steps, and "a" or "an" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

While at least one exemplary embodiment has been presented in the foregoing detailed description, it should be appreciated that a vast number of variations exist. It should also be appreciated that the exemplary embodiment or embodiments described herein are not intended to limit the scope, applicability, or configuration of the claimed subject matter in any way. Rather, the foregoing detailed description will provide those skilled in the art with a convenient road map for implementing the described embodiment or embodiments. It should be understood that various changes can be made in the function and arrangement of elements without departing from the scope defined by the claims, which includes known equivalents and foreseeable equivalents at the time of filing this patent application.

What is claimed is:

1. A cabin segment for a vehicle, the cabin segment comprising:
   a first lateral segment module having a first main extension axis;
   a second lateral segment module having a second main extension axis; and an aisle arranged in the cabin segment and having an extension axis;
   wherein the first main extension axis and the second main extension axis run parallel to each other;
   wherein the first lateral segment module and the second lateral segment module are distanced from each other in a direction perpendicular to the main extension axes and enclose the aisle, which runs parallel to the main extension axes;
   wherein the first lateral segment module and the second lateral segment module are configured asymmetrically relative to each other such that the extension axis of the aisle is parallel and offset relative to a center axis of the cabin segment;
   wherein at least one of the first lateral segment module and the second lateral segment module comprises a lavatory, which is accessible through a lavatory opening positioned outside the aisle;
   wherein the first lateral segment module comprises at least one receiving space to receive serving trolleys, wherein the at least one receiving space comprises a receiving opening, which is facing into the aisle.

2. The cabin segment according to claim 1, wherein the at least one receiving space is configured to receive serving trolleys, which are arranged transverse to the first main extension axis and are staggered parallel to the first main extension axis.

3. The cabin segment according to claim 1, wherein at least one of the lateral segment modules comprises at least one second compartment having an access opening, which runs perpendicular to the main extension axes.

4. The cabin segment according to claim 1, wherein each of the lateral segment modules comprises a front, which directly connects to a door region of the vehicle.

5. The cabin segment according to claim 1, wherein at least one lateral segment module comprises a holding device, which is positioned exterior to the aisle and exterior to the receiving space, for temporary holding a serving trolley.

6. The cabin segment according to claim 1, wherein at least one lateral segment module comprises a door for closing an access opening, wherein the door comprises a vehicle attendant seat arranged thereon.

7. The cabin segment according to claim 1, wherein at least one lateral segment module comprises a fixed walling facing away from the aisle, onto which walling a vehicle attendant seat is arranged.

8. The cabin segment according to claim 1, wherein at least one of the lateral segment modules comprises a first compartment, which is closed at a side facing the aisle, and wherein the first compartment comprises an access opening arranged parallel to the main extension axes.

9. The cabin segment according to claim 8, wherein the first compartment is configured to receive at least one electrical kitchen appliance.

10. The cabin segment according to claim 1, further comprising a third segment module, which is positioned at a side of the cabin segment facing away from the lavatory opening and which extends between the first lateral segment module and the second lateral segment module, wherein the third segment module comprises a second working surface, which is swivable around a horizontal axis, which is located at a side of the cabin segment facing away from the lavatory opening, into a substantially vertical stowage position and a horizontal use position.

11. The cabin segment according to claim 10, wherein the first lateral segment module comprises a first working surface above the receiving space for serving trolleys, which first working surface comprises a height, which substantially equals a height of the second working surface of the third segment module in a horizontal use position.

12. The cabin segment according to claim 10, wherein the receiving space comprises a holding frame that is swivably supported in a horizontal plane and holds a serving trolley, which is directly adjacent to the third segment module, in the receiving space and releases it through swiveling.

13. A passenger cabin comprising:
   a plurality of seats;
   a first aisle arranged between two of the plurality of seats; said first aisle having a first extension axis; and
   at least one cabin segment, each of the at least one cabin segment comprising:
      a first lateral segment module having a first main extension axis;
      a second lateral segment module having a second main extension axis; and a second aisle arranged in the cabin segment and having a second extension axis;
      wherein the first main extension axis and the second main extension axis run parallel to each other;
      wherein the first lateral segment module and the second lateral segment module are distanced from each other in a direction perpendicular to the main extension axes and enclose the second aisle, which runs parallel to the main extension axes;
      wherein the first lateral segment module and the second lateral segment module are configured asymmetrically relative to each other such that the second extension axis of the second aisle is parallel to and offset relative to the first extension axis of the first aisle;

wherein at least one of the first lateral segment module and the second lateral segment module comprises a lavatory, which is accessible through a lavatory opening positioned outside the second aisle; and wherein the first lateral segment module comprises at least one receiving space to receive serving trolleys, wherein the at least one receiving space comprises a receiving opening, which is facing into the second aisle.

14. A vehicle comprising:

a passenger cabin having a plurality of seats and a first aisle arranged between two of the plurality of seats, said first aisle having a first extension axis; and at least one cabin segment, each of the at least one cabin segment comprising:

a first lateral segment module having a first main extension axis;

a second lateral segment module having a second main extension axis; and a second aisle arranged in the cabin segment;

wherein the first main extension axis and the second main extension axis run parallel to each other;

wherein the first lateral segment module and the second lateral segment module are distanced from each other in a direction perpendicular to the main extension axes and enclose the second aisle, which runs parallel to the main extension axes;

wherein the first lateral segment module and the second lateral segment module are configured asymmetrically relative to each other such that the second extension axis of the second aisle is parallel to and offset relative to the first extension axis of the first aisle;

wherein at least one of the first lateral segment module and the second lateral segment module comprises a lavatory, which is accessible through a lavatory opening positioned outside the second aisle; and wherein the first lateral segment module comprises at least one receiving space to receive serving trolleys, wherein the at least one receiving space comprises a receiving opening, which is facing into the second aisle.

15. The vehicle according to claim 14, wherein the vehicle is an aircraft, and wherein the cabin segment is arranged at a rear end of the passenger cabin, which is pressurizable and which comprises a pressure bulkhead at the rear end.

* * * * *